(12) United States Patent
Shao et al.

(10) Patent No.: US 7,272,024 B2
(45) Date of Patent: Sep. 18, 2007

(54) SYNCHRONIZED RECTIFICATION CIRCUIT AND SWITCHING POWER SUPPLY DEVICE

(75) Inventors: Geliang Shao, Saitama (JP); Hiroaki Takada, Saitama (JP)

(73) Assignee: Tamura Corporation, Tokyo (JP)

( * ) Notice: Subject to any disclaimer, the term of this patent is extended or adjusted under 35 U.S.C. 154(b) by 0 days.

(21) Appl. No.: 11/448,662

(22) Filed: Jun. 8, 2006

(65) Prior Publication Data
US 2006/0279972 A1    Dec. 14, 2006

(30) Foreign Application Priority Data
Jun. 8, 2005   (JP) ............................ 2005-168110

(51) Int. Cl.
  H02M 3/335   (2006.01)
  H02M 5/42    (2006.01)
  H02M 7/04    (2006.01)
(52) U.S. Cl. ............................ 363/21.14; 363/21.16; 363/89
(58) Field of Classification Search ............. 363/21.14, 363/21.16, 21.17, 53, 89, 127
See application file for complete search history.

(56) References Cited

U.S. PATENT DOCUMENTS

| 5,708,571 | A  | * | 1/1998  | Shinada ....................... 363/16 |
| 6,130,828 | A  | * | 10/2000 | Rozman ..................... 363/21.06 |
| 6,188,592 | B1 | * | 2/2001  | Farrington et al. ........... 363/98 |
| 6,594,159 | B2 | * | 7/2003  | Schlecht ....................... 363/16 |
| 6,731,520 | B2 | * | 5/2004  | Schlecht ....................... 363/16 |
| 6,894,468 | B1 | * | 5/2005  | Bretz et al. .................. 323/274 |
| 6,995,991 | B1 | * | 2/2006  | Yang et al. ............... 363/21.14 |
| 7,035,120 | B2 | * | 4/2006  | Tobita ..................... 363/21.06 |
| 7,119,524 | B2 | * | 10/2006 | Bretz et al. .................. 323/274 |

* cited by examiner

Primary Examiner—Bao Q. Vu
(74) Attorney, Agent, or Firm—Arent Fox LLP.

(57) ABSTRACT

A synchronized rectification circuit and a switching power supply device having little power loss with respect to a wide range of input voltages and having a high efficiency, comprising first and second switch elements, first and second capacitors connected with each other capable to equalize held voltages thereof in response to sift of an input AC voltage to intermediate voltage (for example 0V), a first driving circuit for turning on a switch element according to the held voltage changed in response to shift the input AC voltage to 0V from a negative polarity voltage and turning off the switch element earlier than a time where the input voltage shifts to the negative polarity voltage from 0V, and a second driving circuit to drive a switch element in the same way but in reverse phase.

5 Claims, 10 Drawing Sheets

FIG. 1B TRANSFORMER OUTPUT VOLTAGE

FIG. 1C Q100 GATE VOLTAGE

FIG. 1D Q200 GATE VOLTAGE

FIG. 1E Q100 Id CURRENT

FIG. 1F Q200 Id CURRENT

FIG. 1A

FIG. 2B TRANSFORMER OUTPUT VOLTAGE

FIG. 2C Q100 GATE VOLTAGE

FIG. 2D Q200 GATE VOLTAGE

FIG. 2E Q100 Id CURRENT

FIG. 2F Q200 Id CURRENT

SYNCHRONIZED RECTIFICATION CIRCUIT AND SWITCHING POWER SUPPLY DEVICE

BACKGROUND OF THE INVENTION

1. Field of Invention

The present invention relates to a switching power supply device for converting a DC voltage to a desired voltage and supplying the same to an electrical apparatus, more particularly relates to technology for synchronized rectification of the same.

2. Description of the Art

A synchronized rectification type switching power supply device is a switching power supply device which uses field effect transistors etc. as rectifiers in place of the usual diodes configuring the rectification circuit and is employed for the purpose of reducing loss by reducing a forward direction voltage drop.

Below, there is described a synchronized rectification type switching power supply device of the art disclosed in Japanese Patent Publication (A) No. 2003-189608 with reference to the attached drawings.

Figure 1A:
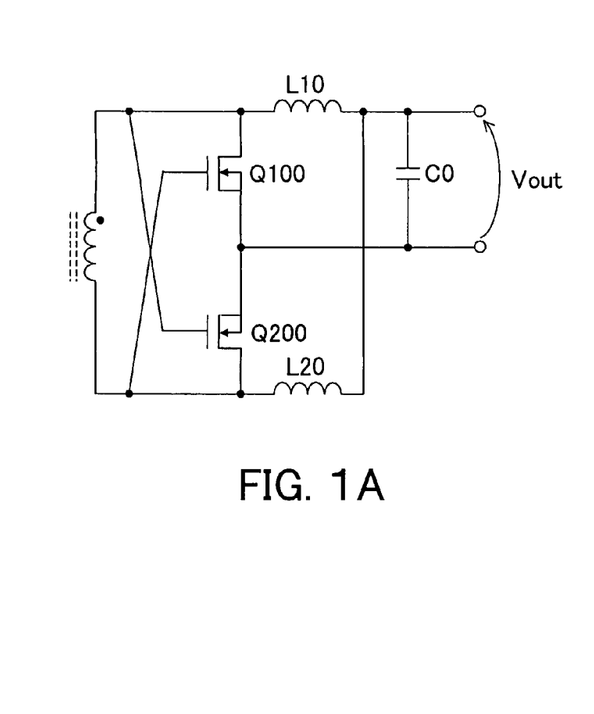
FIGS. 1A to 1F are diagrams for explaining a switching power supply device of the related art.
Figure 1B:
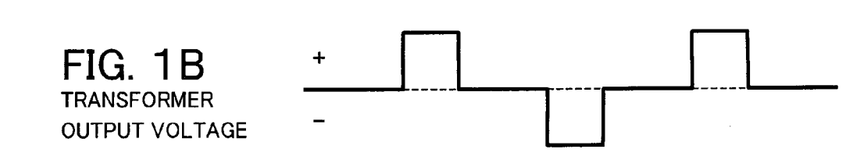
Figure 1C:
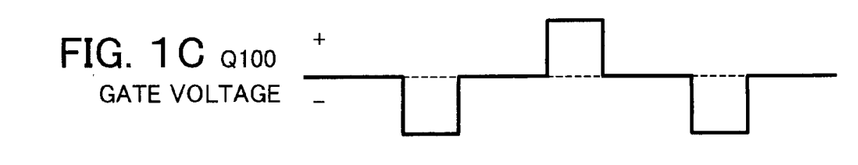
Figure 1D:
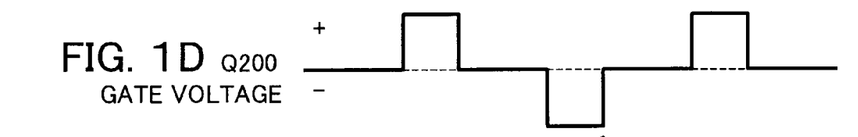
Figures 1E, 1F:
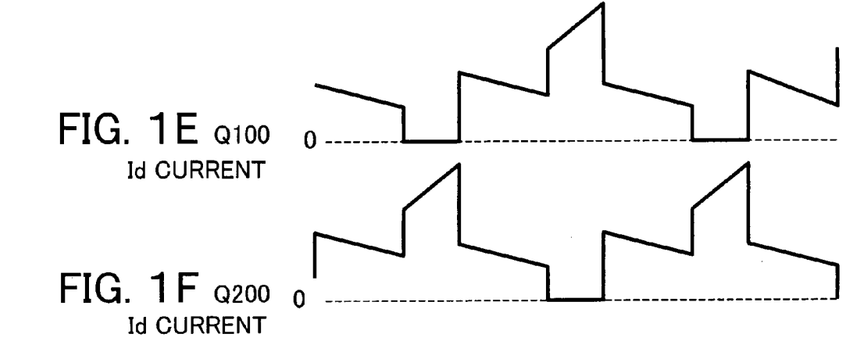

FIGS. 1A to 1F are diagrams for explaining an example of the synchronized rectification type switching power supply device of the art, in which FIG. 1A is a circuit diagram, and FIGS. 1B to 1F are timing charts of portions of it. In the timing charts, FIG. 1B shows an output voltage of a transformer, FIG. 1C shows a gate voltage of an NMOS transistor Q100, FIG. 1D shows the gate voltage of an NMOS transistor Q200, FIG. 1E shows a drain current Id of the NMOS transistor Q100, and FIG. 1F shows a drain current Id of the NMOS transistor Q200.

The switching power supply device shown in FIG. 1A employs the technology of synchronized rectification using current doubler output. In this switching power supply device, when there is no output of the transformer, that is, in a commutation state, energy is released from a filter inductor L10 and the current commutes. At this time, as shown in FIGS. 1C and 1D, the NMOS transistors Q100 and Q200 are turned off. Accordingly, the commutation current is output through parasitic diodes between drains and sources of the NMOS transistors Q100 and Q200. Therefore, a loss at the time of the commutation (commutation loss) is large.

Figure 2A:
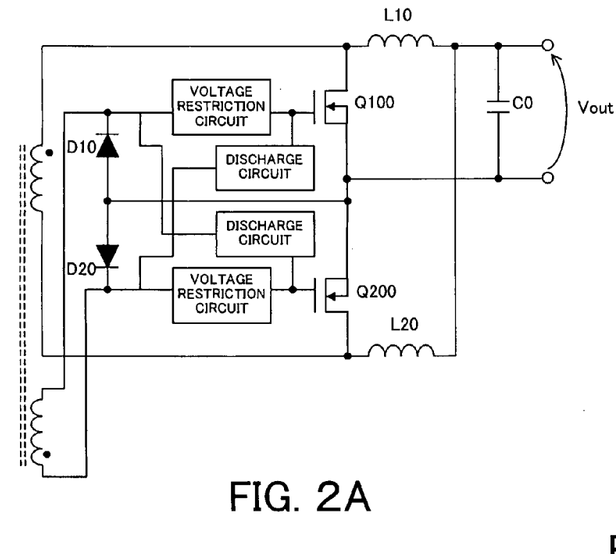
FIGS. 2A to 2F are diagrams for explaining a switching power supply device of the related art.
Figures 2B, 2C:
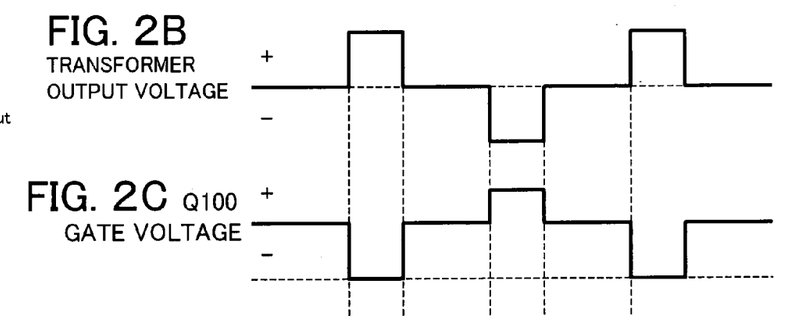
Figures 2D, 2E, 2F:
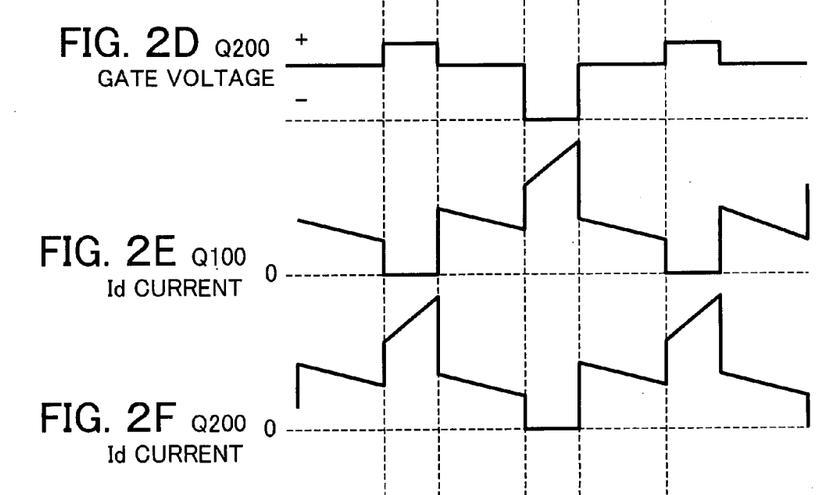

FIGS. 2A to 2F are diagrams for explaining another example of a synchronized rectification type switching power supply device of the art, in which FIG. 2A is a circuit diagram, and FIGS. 2B to 2F are timing charts of different parts. In the timing charts, FIG. 2B shows an output voltage of a transformer, FIG. 2C shows a gate voltage of an NMOS transistor Q100, FIG. 2D shows a gate voltage of an NMOS transistor Q200, FIG. 2E shows a drain current Id of the NMOS transistor Q100, and FIG. 2F shows a drain current Id of the NMOS transistor Q200.

In the switching power supply device shown in FIG. 2A, in comparison with the switching power supply device shown in FIG. 1A, an auxiliary winding, a voltage restriction circuit for restricting gate voltages of the NMOS transistors Q100 and Q200 based on the output signal the auxiliary winding and a discharge circuit are added. Due to this, as shown in FIGS. 2C and 2D, the NMOS transistors Q100 and Q200 are turned on even when there is no output of the transformer, so the above commutation loss is suppressed.

In the switching power supply device shown in FIG. 2A, however, when the input voltage with respect to the transformer widely fluctuates, the voltage restriction circuit is provided for restricting the drive peak voltage to a gate destruction voltage or less, and the drive voltage is clamped to the predetermined restricted value by this. Accordingly, a drive loss of that amount occurs.

Further, at the time of the input of a low voltage, the drive voltage becomes lower than the clamp voltage during the commutation period when there is no transformer output, and the ON resistances of the NMOS transistors Q100 and Q200 increase, therefore the commutation loss increases. For example, a time T5 to T7 of FIG. 2E is the commutation period. At the time T5, the drain current Id of the NMOS transistor Q100 abruptly drops, but in actuality, energy cannot be sharply released from the inductor part, therefore the drain current in the time T5 to T7 remains as a current having a magnitude near the peak current in a time T4 to T5 (see FIG. 9C). On the other hand, as seen in FIG. 2C, in the time T5 to T7 (commutation period), a drive voltage relatively small in comparison with the clamp voltage in the time T4 to T5 (drive period) is supplied to the gate of the NMOS transistor Q100, therefore, in the time T5 to T7 (commutation period), the commutation loss becomes large due to the increase of the ON resistance of the NMOS transistor Q100 and the actually maintained large current together.

SUMMARY OF THE INVENTION

It is therefore desirable in the present invention to provide a synchronized rectification circuit of a high efficiency and a switching power supply device with little power loss with respect to a wide range of input voltages.

According to a first aspect of the present invention, there is provided a synchronized rectification circuit comprising an inputting means for inputting an AC voltage that becomes a negative polarity voltage in a first period, becomes a positive polarity voltage in a third period, and becomes an intermediate voltage between the negative voltage and the positive voltage in second and forth periods; a rectification means including a first switch element and a second switch element and for inputting the AC voltage from the inputting means; a first voltage holding means for holding a voltage in response to shift an input voltage of the rectification means to the positive polarity voltage and releasing the held voltage in response to input the negative voltage; a second voltage holding means connected with the first voltage holding means capable to equalize held voltages in response to sift the input voltage to the intermediate voltage, for holding a voltage in response to shift the input voltage to the negative polarity voltage and releasing the held voltage in response to input the positive voltage; a first driving means for turning on the first switch element according to the held voltage of the first voltage holding means changed in response to shift the input voltage to the intermediate voltage from the negative polarity voltage and turning off the first switch element earlier than a time where the input voltage shifts to the negative polarity voltage from the intermediate voltage; and a second driving means for turning on the second switch element according to the held voltage of the second voltage holding means changed in response to shift the input voltage to the intermediate voltage from the positive polarity voltage and turning off the second switch element earlier than a time where the input voltage shifts to the positive polarity voltage from the intermediate voltage.

According to a second aspect of the present invention, there is provided a synchronized rectification circuit comprising a transformer having a primary winding, a secondary winding and an auxiliary winding and for inputting via the primary winding an AC voltage that becomes alternately a negative polarity voltage and a positive voltage and becomes an intermediate voltage having a value between the negative voltage and the positive voltage in transition periods of voltage polarity; a trigger voltage generation circuit for generating a first trigger voltage advanced in phase with respect to the positive polarity voltage at a time of inputting to the transformer and a second trigger voltage advanced in phase with respect to the negative polarity voltage at a time of inputting to the transformer; a rectification means including a first switch element connected to one end of the secondary winding and a second switch element connected to the other end of the secondary winding; first and second capacitors connected in series between one and the other ends of the auxiliary winding; a first discharging diode connected in parallel to the first capacitor; a second discharging diode connected in parallel to the second capacitor; a first transistor connected between the one end of the auxiliary winding and a control node of the first switch element and for turning on the first switch element in response to input the positive polarity voltage to the transformer; a second transistor for turning on the first switch element in response to receive the first trigger voltage; a third transistor connected between the other end of the auxiliary winding and a control node of the second switch element and for turning on the second switch element in response to input the negative polarity voltage to the transformer; and a forth transistor for turning on the second switch element in response to receive the second trigger voltage.

According to a third aspect of the present invention, there is provided a switching power supply device comprising a switching circuit for switching a conductive state of a DC voltage and generating a AC voltage which alternately becomes a negative polarity voltage and a positive polarity voltage and becomes an intermediate voltage having a value between the negative voltage and the positive voltage in transition periods of voltage polarity; a transformer having a primary winding, a secondary winding and an auxiliary winding and for inputting via the primary winding the AC voltage; a trigger voltage generation circuit for generating a first trigger voltage advanced in phase with respect to the positive polarity voltage at a time of inputting to the transformer and a second trigger voltage advanced in phase with respect to the negative polarity voltage at a time of inputting to the transformer; a rectification circuit including a first switch element connected to one end of the secondary winding and a second switch element connected to the other end of the secondary winding; a drive circuit for driving the first and second switch elements according to an AC voltage input via the auxiliary winding; and a control circuit for controlling a ratio of the negative polarity voltage and the positive polarity voltage in one cycle of the AC voltage to be input to the transformer in accordance with an output voltage of the rectification means, wherein the drive circuit has first and second capacitors connected in series between one and the other ends of the auxiliary winding, a first discharging diode connected in parallel to the first capacitor, a second discharging diode connected in parallel to the second capacitor, a first transistor connected between the one end of the auxiliary winding and a control node of the first switch element and for turning on the first switch element in response to input the positive polarity voltage to the transformer, a second transistor for turning on the first switch element in response to receive the first trigger voltage, a third transistor connected between the other end of the auxiliary winding and a control node of the second switch element and for turning on the second switch element in response to input the negative polarity voltage to the transformer, and a forth transistor for turning on the second switch element in response to receive the second trigger voltage.

According to the present invention, high efficiently synchronized rectification with little power loss can be realized for a wide range of input voltages.

BRIEF DESCRIPTION OF THE DRAWINGS

These and other objects and features of the present invention will become clearer from the following description of the preferred embodiments given with reference to the attached drawings, wherein:

FIG. 8 is an equivalent circuit diagram of a drive circuit when the rectifier according to an embodiment of the present invention is turned on;

DESCRIPTION OF THE PREFERRED EMBODIMENTS

Below, there is described an embodiment of a switching power supply device according to the present invention with reference to the attached drawings.

Configuration of Switching Power Supply Device 1

Figure 3:
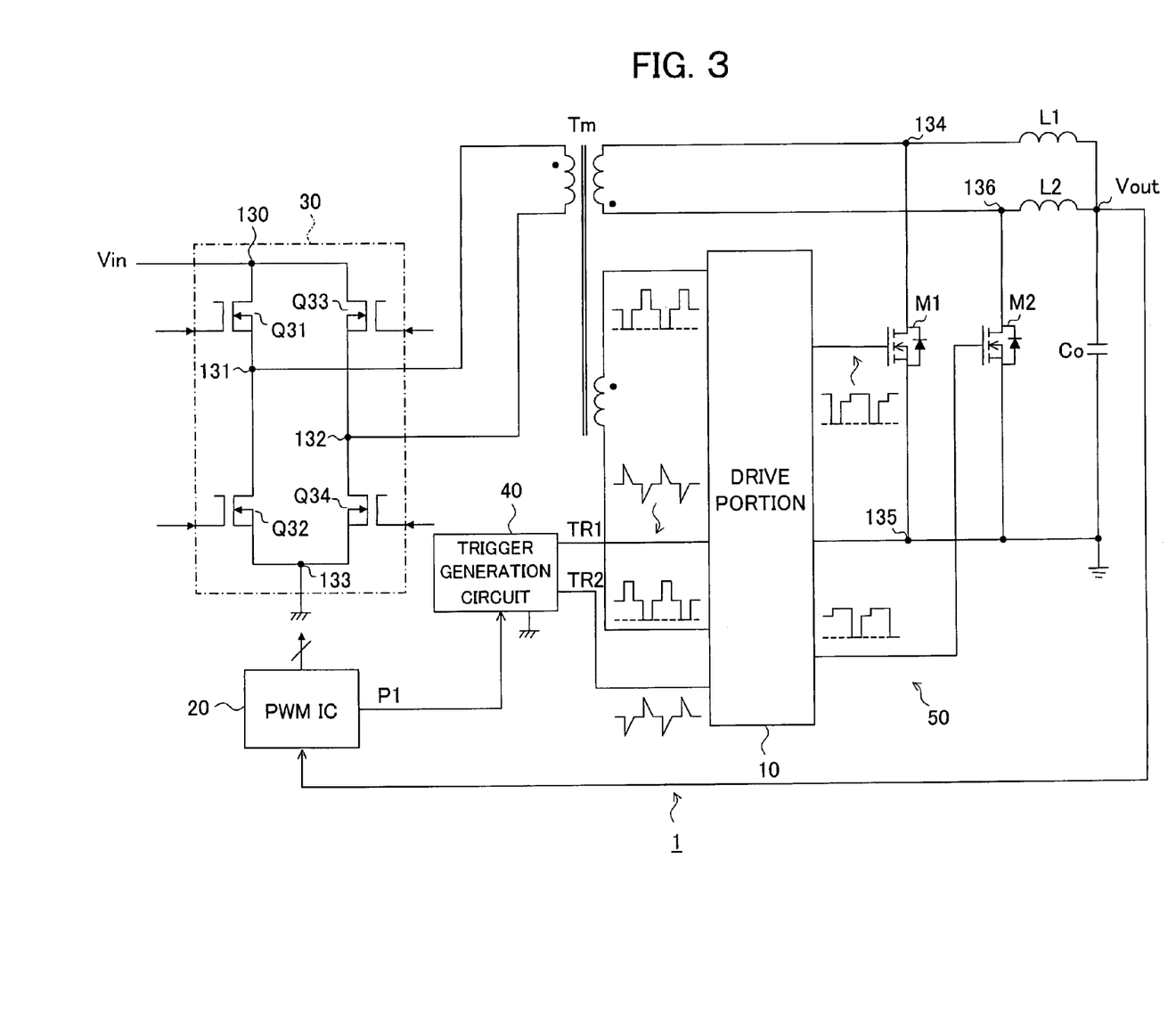
FIG. 3 is a block diagram showing a circuit configuration of a switching power supply device according to an embodiment of the present invention.

FIG. 3 is a block diagram showing the circuit configuration of a switching power supply device 1 according to an embodiment of the present invention. The switching power supply device 1 is for full wave rectification of the full bridge type and includes, as principal components, a switching circuit 30, a synchronized rectification circuit 50 for synchronized rectification of the output voltage of a transformer Tm, a pulse width modulation (PWM) control circuit (PWM IC) 20 for controlling the switching circuit based on an output voltage Vout, and a trigger signal generation circuit 40. Further, the switching power supply device 1 shown in FIG. 3 has outputs of the current doubler type including inductors L1 and L2. In this current doubler type output, currents flowing in the inductors L1 and L2 are offset in phase from each other by 180 degrees, whereby current ripple is cancelled.

In the switching power supply device 1, an input DC voltage Vin is converted to an AC voltage by the switching circuit 30 and given to the transformer Tm. The transformer Tm insulates the given AC voltage and transmits it to the secondary side, the transmitted AC voltage is rectified by the rectifiers M1 and M2, and thereby the output voltage Vout is generated. Note that, in the present embodiment, the rectifiers M1 and M2 are NMOS transistors. The output voltage Vout is insulated by for example a photocoupler (not shown) and fed back to the PWM control circuit 20. The polarity ratio of AC voltages generated in the switching circuit 30 is controlled in accordance with that value.

In the synchronized rectification circuit 50, the drive portion 10 connected to the auxiliary winding provided in the transformer Tm controls the rectifiers M1 and M2 based on the AC voltage generated by the switching circuit 30 and thereby realizes a rectification operation. Note that, the transformer Tm, the rectifiers constituted by the NMOS transistors M1 and M2, and the drive portion 10 correspond to the synchronized rectification circuit of the claims of the present invention. Specifically, in the drive portion 10, in accordance with the voltage polarity generated in the secondary winding of the transformer Tm, either of the NMOS transistor M1 or M2 is turned off. By this rectification operation, a desired DC voltage output Vout is generated at the output terminal.

The PWM control circuit 20 supplies a PWM signal P1 in synchronization with the control signal given to the switching circuit 30 with respect to the trigger signal generation circuit 40. This PWM signal P1 is controlled in accordance with the timing of the control signal given to the switching circuit 30. The trigger signal generation circuit 40 generates the trigger signal based on the PWM signal P1 and supplies it to the drive portion 10. As will be explained later, the efficiency of the synchronized rectification in the drive portion 10 can be raised by this trigger signal.

Below, the configurations of the parts of the switching power supply device 1 will be explained in sequence.

Switching Circuit 30

The switching circuit 30 is configured by four NMOS transistors Q31 to Q34 and operates when the control signal from the PWM control circuit 20 is given to the gate of each NMOS transistor.

As shown in FIG. 3, a drain of the NMOS transistor Q31 is connected to a node 130 to which the DC voltage Vin is supplied, and a source is connected to a node 131 forming one end of the primary winding of the transformer Tm. A drain of the NMOS transistor Q32 is connected to the node 131, and a source is connected to the ground terminal 133. A drain of the NMOS transistor Q33 is connected to the node 130, and a source is connected to a node 132 forming the other end of the primary winding of the transformer Tm. A drain of the NMOS transistor Q34 is connected to the node 132, and a source is connected to the ground terminal 133.

In the switching circuit 30, in the first period, both of the NMOS transistors Q32 and Q33 are turned on, whereby the voltage generated in the primary winding of the transformer Tm becomes negative. In the second period, both of the NMOS transistors Q31 and Q34 are turned on, whereby the voltage generated in the primary winding of the transformer Tm becomes positive. In the third period between the first period and the second period, for example, both of the NMOS transistors Q32 and Q34 are turned on, whereby the voltage generated in the primary winding of the transformer Tm becomes 0. To generate such an AC voltage, the PWM control circuit 20 gives a control signal to the switching circuit 30. Note that the above first to third periods correspond to the first to third periods of the claims of the present invention. In the secondary winding of the transformer Tm, a voltage obtained by inverting the AC voltage generated by the switching circuit 30 is excited.

Trigger Signal Generation Circuit 40

Figure 4:
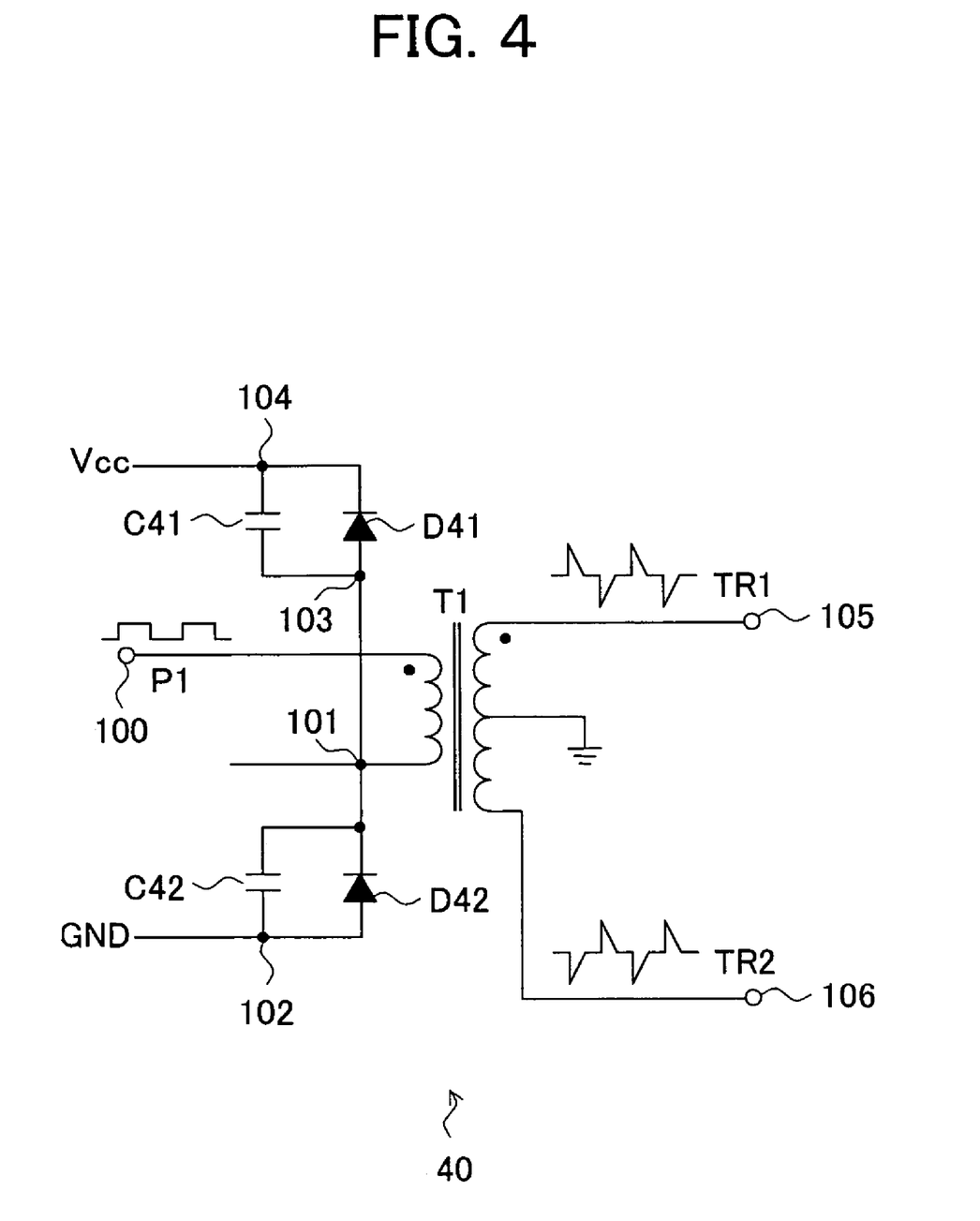
FIG. 4 is a circuit diagram showing an example of the configuration of a trigger signal generation circuit.

FIG. 4 shows an example of the circuit diagram of the trigger signal generation circuit 40. The trigger signal generation circuit 40 receives as input the PWM signal P1 from the PWM control circuit 20 through a node 100, generates trigger signals TR1 and TR2 having narrow widths and inverted from each other (offset in phase by 180 degrees), and outputs them from nodes 105 and 106. As shown in FIG. 4, the trigger signal generation circuit 40 is configured by diodes D41 and D42, capacitors C41 and C42, and a transformer T1. The capacitors C41 and C42 are capacitors for charging and discharging of small capacities of tens to hundreds of pF. The diodes D41 and D42 are diodes for resetting the transformer T1.

The winding of the primary side of the transformer T1 is connected between the node 100 and a node 101. The capacitor C41 and the diode D41 are connected between a node 103 and a terminal 104 in parallel. The capacitor C42 and the diode D42 are connected between the node 101 and the terminal 102 in parallel.

When the PWM signal P1 changes from the L level (low level) to the H level (high level), the capacitor C42 is charged and the capacitor C41 discharges through the route of terminal 100→primary winding of transformer T1→nodes 101 and 103→capacitors C41 and C42. The capacitances of the capacitors C41 and C42 are small, therefore, the charging and discharging are completed in an extremely short time, then the transformer T1 is reset by the forward direction voltage $V_F$ of the diode D41.

When the PWM signal P1 changes from the H level to the L level, the capacitor C41 is charged and the capacitor C42 discharges through the route of the capacitors C41, C42→nodes 101, 103→primary winding of transformer T1→node 100. The capacitances of the capacitors C41 and C42 are small, therefore, the charging and discharging are completed in an extremely short time, then the transformer T1 is reset by the forward direction voltage $V_F$ of the diode D42.

Due to the above operation, the trigger signals TR1 and TR2 generated in the secondary winding of the transformer T1 are signals having narrow widths in accordance with the timing of the rising/falling of the input PWM signal and become alternately inverted signals.

Note that, in the switching power supply device 1 according to the present embodiment, as will be explained later, the trigger signal generated by the trigger generation circuit must be advanced in rising time a little with respect to the signal input to the transformer Tm, but the PWM control circuit 20 supplies the PWM signal P1 to the trigger signal generation circuit 40 in synchronization with the control signal given to the switching circuit 30. When performing this, there is a response delay of the transistor (FET) in the switching circuit 30, therefore, the trigger signal naturally begins to advance in rising time with respect to the signal input to the transformer Tm. Further, the PWM control circuit 20 may be configured so as to control output timings of the control signal to be given to the switching circuit and the PWM signal P1 to be given to the trigger generation circuit so that the rising time is advanced by exactly a required period.

Note that, in the trigger signal generation circuit 40, it is also possible to provide a transistor according to need and amplify and process the PWM signal P1 supplied from the PWM control circuit 20.

Drive Portion 10 in Synchronized Rectification Circuit 50

Figure 5:
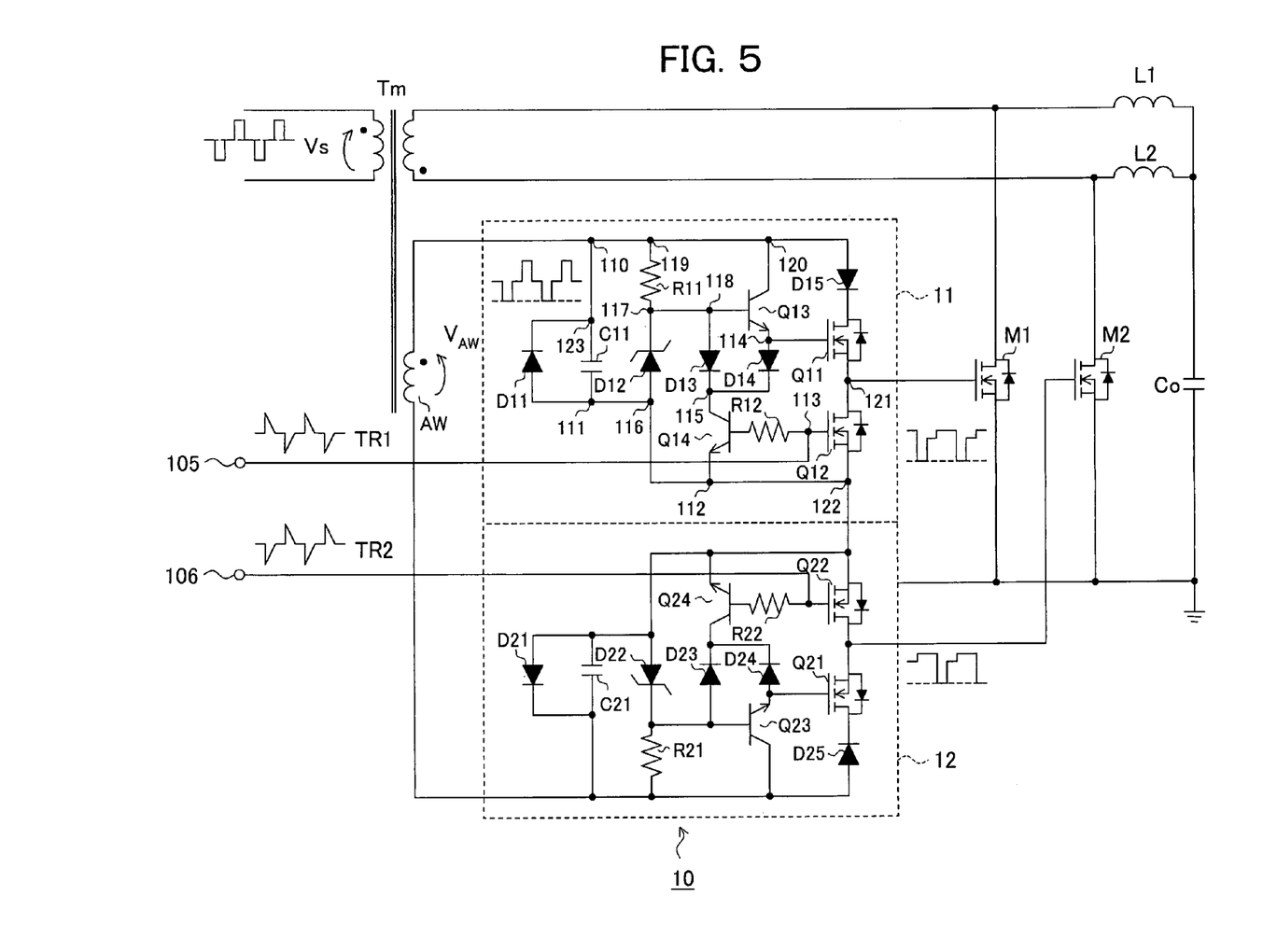
FIG. 5 is a circuit diagram of a synchronized rectification circuit according to an embodiment of the present invention.

FIG. 5 is a circuit diagram of the drive portion 10 in an embodiment of the present invention. As shown in the figure, the drive portion 10 includes a drive circuit 11 for driving the rectifier constituted by the NMOS transistor M1 and a drive circuit 12 for driving the rectifier constituted by the NMOS transistor M2. In the drive portion 10, the NMOS transistor M1 is turned off when the input voltage Vs of the transformer Tm is negative, and the NMOS transistor M2 is turned off when the input voltage Vs is positive. When the input voltage Vs of the transformer Tm is 0, the "commutation state" where both of the NMOS transistors M1 and M2 become ON and the energy stored in the inductor L1 or L2 is released is exhibited. Therefore, in the drive circuit 11 and the drive circuit 12, the circuit configurations are exactly the same (line symmetric about the ground line), and the operations become completely reverse. Accordingly, in the following explanation, the circuit configuration and operation of the drive circuit 11 will mainly be explained.

Drive Circuit 11

As shown in FIG. 5, the drive circuit 11 is provided with an auxiliary winding AW for the transformer Tm. Here, when the voltage generated in the auxiliary winding AW is $V_{AW}$, the voltage $V_{AW}$ becomes a voltage having the same polarity with respect to the input voltage Vs of the transformer Tm.

The NMOS transistor Q11 is a transistor for controlling the operation of the rectifier constituted by the NMOS transistor M1. A gate of the NMOS transistor Q11 is connected to a node 114, a drain is connected to a cathode of the diode D15, and a source is connected to a gate of the NMOS transistor M1 via a node 121.

An anode of the diode D15 is connected to the auxiliary winding AW. When the voltage $V_{AW}$ of the auxiliary winding AW is positive, the diode D15 gives the voltage level thereof via the drain and source of the NMOS transistor Q11 to the gate of the NMOS transistor M1. Further, the diode D15 prevents the gate charge of the NMOS transistor M1 from discharging to the auxiliary winding AW side in order to turn on the NMOS transistor M1 at the time of commutation.

The transistor Q13 is a transistor for controlling the NMOS transistor Q11. A base of the transistor Q13 is connected via nodes 118 and 117 to a base resistor constituted by the resistor R11. A collector of the transistor Q13 is connected via the node 120 to the auxiliary winding AW, and an emitter is connected via the node 114 to the gate of the NMOS transistor Q11. When the voltage $V_{AW}$ of the auxiliary winding AW is positive, the transistor Q13 turns on, and the gate of the NMOS transistor Q11 is charged.

The capacitor C11 is connected via a node 110 to the auxiliary winding AW and is connected to the ground terminal. The diode D11 is connected in parallel to the capacitor C11. The capacitor C11 is charged when the voltage $V_{AW}$ of the auxiliary winding AW is positive and discharged when the voltage $V_{AW}$ is negative.

The diode D12 is a Zener diode connected between a node 116 and the node 117. The diode D12 is provided for clamping the gate voltage of the NMOS transistor M1 to a constant level. When the voltage $V_{AW}$ of the auxiliary winding AW is positive, the voltage $V_{AW}$ or the charge voltage of the capacitor C11 is supplied to the gate of the NMOS transistor M1 via the drain and source of the NMOS transistor Q11. At this time, the transistor Q13 turns on, therefore the gate voltage of the NMOS transistor M1 is clamped to the value of $V_{gs}$ (max) of the following Equation (1). Due to this, in the switching power supply device 1, the effect due to the fluctuation of the input voltage becomes very small.

$$V_{gs}(\max) = V_z - V_F - V_{gs}(\text{off}) \quad (1)$$

where, $V_z$: breakdown voltage of Zener diode D12,
$V_F$: forward direction voltage between base and emitter of transistor Q13, and
$V_{gs}$(off): operation threshold voltage of NMOS transistor Q11.

The NMOS transistor Q12 is a transistor for controlling the operation of the NMOS transistor M1 as the rectifier. A gate of the NMOS transistor Q12 is connected to a node 113. Via this node 113, the trigger signal TR1 is supplied to the gate from the trigger signal generation circuit 40. A drain of the NMOS transistor Q12 is connected via the node 121 to the gate of the rectifier constituted by the NMOS transistor M1, and a source is connected to a node 122 (ground terminal). The NMOS transistor Q12 turns on when the trigger signal TR1 is supplied to the gate and drains the gate charge of the NMOS transistor M1. Due to this, the NMOS transistor M1 is turned off.

The transistor Q14 is a transistor for controlling the transistor Q13. A base of the transistor Q14 is connected via a resistor R12 to the node 113. Via this node 113, a base current in accordance with the trigger signal TR1 from the trigger signal generation circuit 40 is generated. A collector of the transistor Q14 is connected to a node 115, and an emitter is connected to the node 112 (ground terminal). Here, a diode D13 is connected between the collector of the transistor Q14 (node 115) and the base of the transistor Q13 (node 118), and a diode D14 is connected between the collector of the transistor Q14 (node 115) and the emitter of the transistor Q13 (node 114). Accordingly, when the transistor Q14 turns on in response to the trigger signal TR1, both of the diodes D13 and D14 turn on, and the transistor Q13 turns off since $V_{be}$ becomes 0. Due to this, the gate charge of the NMOS transistor Q11 is rapidly discharged and the transistor turns off.

Note that it should be noted here that the transistor Q14 turns on at a lower voltage level than the operation threshold voltage $V_T$ of the NMOS transistor Q12. Namely, when the voltage of the node 113 rises up to a certain first level by the trigger signal TR1, earlier than the turning on of the NMOS transistor Q12, the transistor Q14 turns on. Then, when the voltage of the node 113 rises up to a second level exceeding the first level by the trigger signal TR1, the NMOS transistor Q12 turns on. Accordingly, when the voltage of the trigger signal TR1 rises, earlier than the turning on of the NMOS transistor Q12, the NMOS transistor Q11 turns off. Due to this, a large penetration current being generated by both of the NMOS transistors Q11 and Q12 turning on is prevented.

Conversely, when the voltage of the trigger signal TR1 drops from the peak, the NMOS transistor Q12 turns off earlier, and the transistor Q14 turns off next. When the transistor Q14 turns off, the transistor Q13 turns on since the same potential is not obtained between the base and the emitter, so the NMOS transistor Q11 turns on. Accordingly, when the voltage of the trigger signal TR1 falls, earlier than the turning on of the NMOS transistor Q11, the NMOS transistor Q12 turns off. Due to this, a large penetration current being generated by both of the NMOS transistors Q11 and Q12 turning on is prevented.

Above, the circuit configuration of the drive circuit 11 was explained. Next, the operations of the capacitors C11 and C21 and the diodes D11 and D21 in the drive circuit 11 and the drive circuit 12 will be explained with reference to FIG. 5. In the drive circuit 12, the capacitor C21 corresponding to the capacitor C11 is connected to the auxiliary winding AW in the same way and is connected to the ground terminal. The diode D21 is connected in parallel to the capacitor C21.

Therefore, the capacitor C21 performs the reverse operation to that of the capacitor C11 of the drive circuit 11. Namely, the capacitor C21 is charged when the voltage $V_{AW}$ of the auxiliary winding AW is negative and discharged when it is positive. The capacitor C11 of the drive circuit 11 and the capacitor C21 of the drive circuit 12 are connected in series via the ground terminal, therefore, when the voltage $V_{AW}$ of the auxiliary winding AW is 0, a portion of the charge in the capacitor C11 or C21 moves from one to the other. Namely, when the capacitances of the capacitors C11 and C21 are the same degree, a state where the two are almost equally charged is exhibited. Due to this, during the commutation period where the voltage $V_{AW}$ of the auxiliary winding AW is 0, both of the NMOS transistors M1 and M2 can be turned on, whereby the drive efficiency is improved.

Figure 6A:
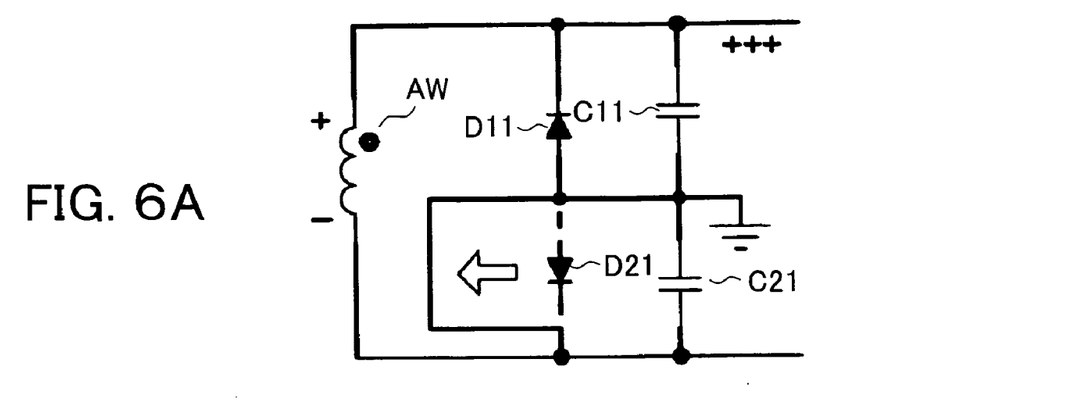
FIGS. 6A to 6C are circuit diagrams of a drive circuit according to an embodiment of the present invention.
Figure 6B:
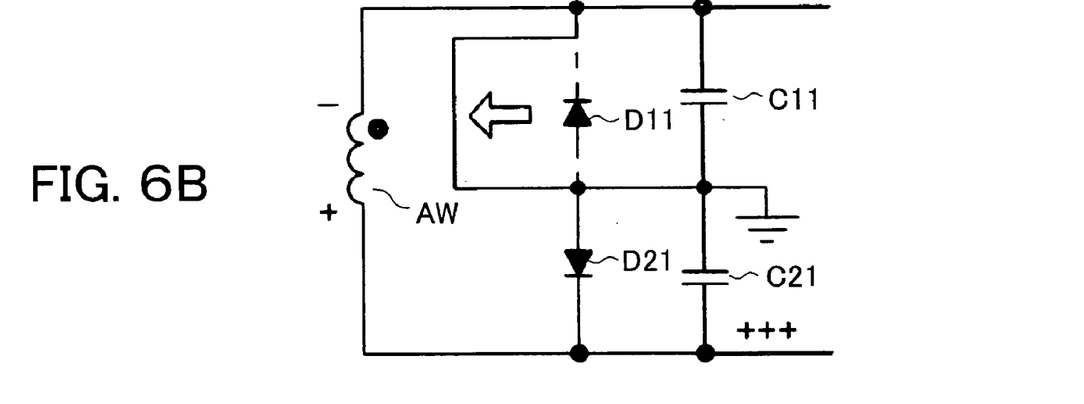
Figure 6C:
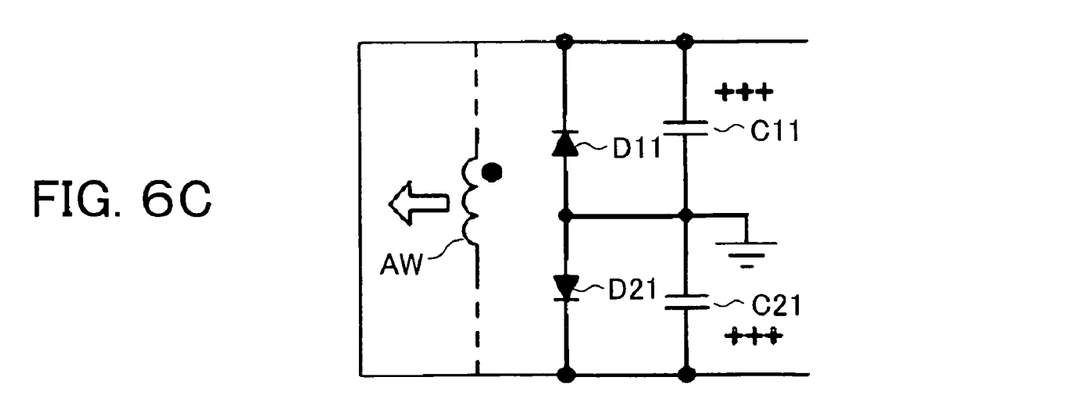

Further, next, the operations of the capacitors C11 and C21 and the diodes D11 and D21 will be explained with reference to FIGS. 6A to 6C. FIGS. 6A to 6C are diagram showing operations of the capacitors C11 and C21 and the diodes D1 and D21 in the drive circuit 11 and the drive circuit 12 as an equivalent circuit, in which FIG. 6A shows a case where the voltage $V_{AW}$ of the auxiliary winding AW is positive, FIG. 6B shows a case where the voltage $V_{AW}$ of the auxiliary winding AW is negative, and FIG. 6C shows case where the voltage $V_{AW}$ of the auxiliary winding AW is 0.

As shown in FIG. 6A, when the voltage $V_{AW}$ of the auxiliary winding AW is positive, the capacitor C11 of the drive circuit 11 is charged. On the other hand, in the drive circuit 12, the diode D21 turns on (short-circuited), and the voltage across the capacitor C21 becomes 0. As shown in FIG. 6B, when the voltage $V_{AW}$ of the auxiliary winding AW is negative, the capacitor C21 of the drive circuit 12 is charged. On the other hand, in the drive circuit 11, the diode D11 turns on (short-circuited), and the voltage across the capacitor C11 becomes 0. As shown in FIG. 6C, when the voltage $V_{AW}$ of the auxiliary winding AW is 0, it can be regarded that the two ends of the auxiliary winding AW are short-circuited. The charge stored in the capacitor C11 or C21 until the voltage $V_{AW}$ becomes 0 moves from one to the other via the ground terminal. Due to this, during the commutation period where the voltage $V_{AW}$ of the auxiliary winding AW is 0, both of the NMOS transistors M1 and M2 can be turned on.

Operation of Drive Circuit 11

Figure 7A:
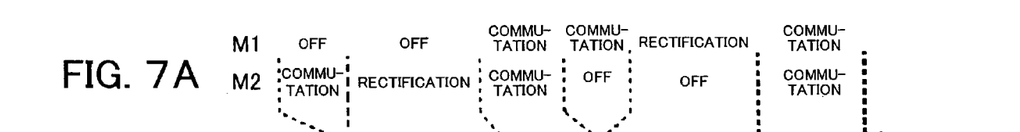
FIGS. 7A to 7G are timing charts showing the operation of the drive circuit according to an embodiment of the present invention.
Figure 7B:
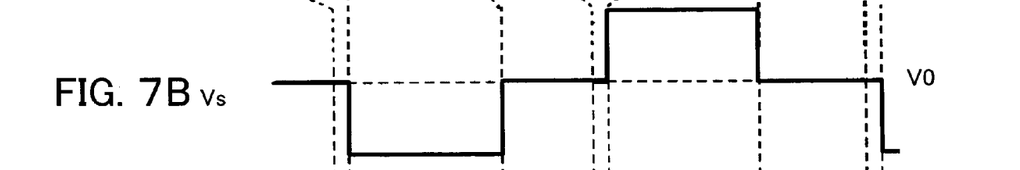
Figures 7C, 7D:
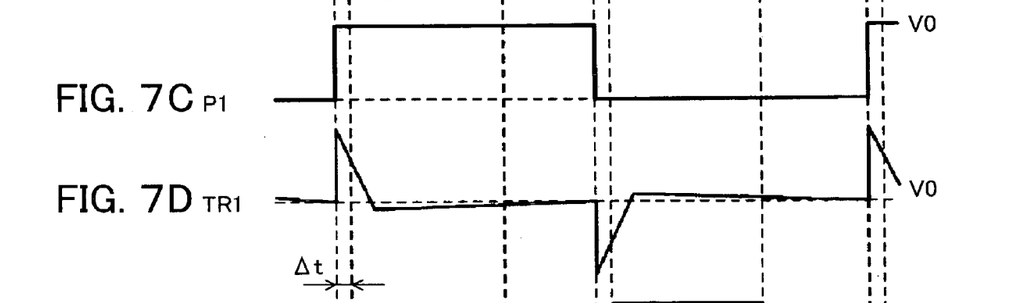
Figures 7E, 7F:
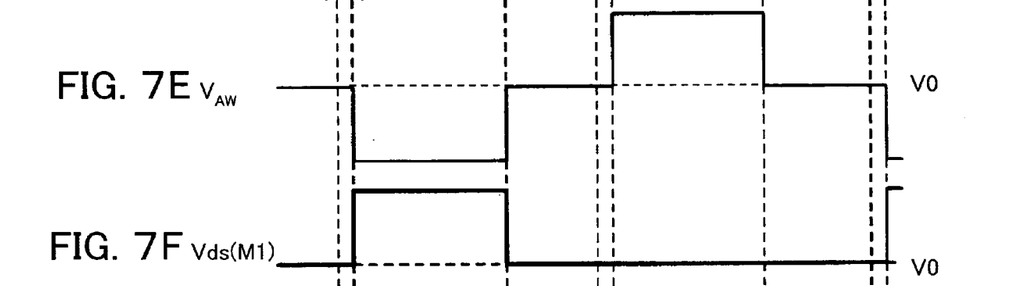
Figure 7G:
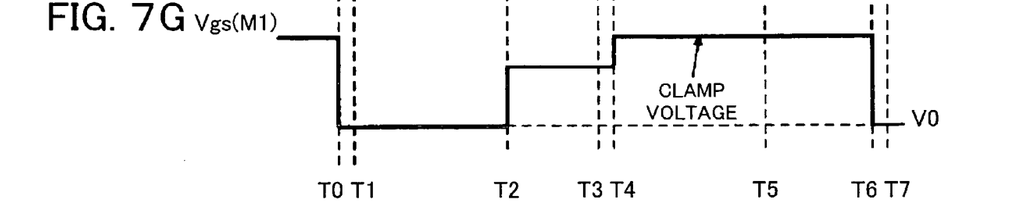

Next, the operation of the drive circuit 11 will be explained with reference to FIGS. 7A to 7G. Note that the operation of the drive circuit 12 is the same as that of the drive circuit 11 except for the point that the operation timing thereof is exactly reverse to that of the drive circuit 11. FIGS. 7A to 7G are timing charts showing voltage waveforms of portions of the drive circuit 11, in which FIG. 7A shows operations of the NMOS transistors M1 and M2, FIG. 7B shows the input voltage Vs of the transformer Tm, FIG. 7C shows the PWM signal P1 of the PWM control circuit 20, FIG. 7D shows the trigger signal TR1, FIG. 7E shows the voltage $V_{AW}$ of the auxiliary winding AW, FIG. 7F shows $V_{ds}$ of the NMOS transistor M1, and FIG. 7G shows $V_{gs}$ of the NMOS transistor M1. Note that, the timing charts of the voltage waveforms of the portions of the drive circuit 12 become ones obtained by inverting the voltage waveforms of the portions shown in FIGS. 7A to 7F.

Below, there is described the operation of the switching power supply device 1 in sequence for a time T0 to T6 as 1 cycle of the output Vs of the transformer Tm in the timing charts of FIGS. 7A to 7F.

(i) Time T0 to T1

First, before the time T0, the NMOS transistor M1 has become the ON state.

At the time T0, as shown in FIG. 7G, the trigger signal TR1 advanced in the rising time from the falling time T1 of the input voltage Vs of the transformer Tm by exactly a predetermined time Δt is given to the node 113 of the drive circuit 11. Then, the transistor Q14 turns on, and the transistor Q13 turns off. The gate charge of the NMOS transistor Q11 is rapidly discharged via the diode D14 and (the drain to source of) the transistor Q14. As a result, the NMOS transistor Q11 turns on.

Due to the trigger signal TR1, the NMOS transistor Q12 turns on with a little delay from the turning on of the transistor Q14. Due to this, the state where both of the NMOS transistors Q11 and Q12 turn on is not exhibited, and no penetration current is generated. When the NMOS transistor Q12 turns on, the gate charge of the NMOS transistor M1 is rapidly drained and the transistor is turned off as shown in FIG. 7G. Note that, in the time T0 to T1, the input voltage Vs of the transformer Tm remains as 0 as it is, therefore the NMOS transistor M2 continues in the commutation state.

Note that, the trigger signal TR1 is raised at the time T0 with a little advance time Δt with respect to the falling time T1 of the input voltage Vs of the transformer Tm because the drain voltage of the NMOS transistor M1 rises due to the falling of the Vs, therefore, when the NMOS transistor M1 has become ON at the point of time when the drain voltage rises, a large penetration current is generated between the drain and the source of the NMOS transistor M1. This is not desirable from the viewpoints of drive efficiency and power consumption.

Note that it is not true that the larger the advance time the better. If the advance time is too large, the commutation period of the NMOS transistor M1 becomes long, and the efficiency of the switching power supply device 1 is lowered. Accordingly, when the switching power supply device 1 is operated with a high frequency, the advance time is desirably for example about 20 to 50 ns.

(ii) Time T1 to T2

When the time T1 comes, as shown in FIGS. 7B and 7E, the input voltage Vs of the transformer Tm becomes negative and the voltage $V_{AW}$ of the auxiliary winding AW becomes negative with a little delay from the trigger signal TR1. Due to this, the equivalent circuit of the capacitors C11 and C21 and the diodes D11 and D21 changes from the state of FIG. 6C to the state of FIG. 6B. Further, as the voltage level of the trigger signal TR1 is gradually lowered, the NMOS transistor Q12 turns off and the transistor Q14 turns off next. However, the capacitor C11 is fully discharged (FIG. 6B), therefore, even when the transistor Q14 turns off, the NMOS transistor Q11 cannot be turned on, and the NMOS transistor M1 remains OFF as it is (FIGS. 7A, 7G). On the other hand, the rectifier of the drive circuit 12 constituted by the NMOS transistor M2 continues to be in the ON state, so the drive circuit 12 performs the rectification operation.

(iii) Time T2 to T3

When the time T2 comes, both of the input voltage Vs of the transformer Tm and the voltage $V_{AW}$ of the auxiliary winding AW become 0. Due to this, the equivalent circuit of the capacitors C11 and C21 and the diodes D11 and D21 change from the state of FIG. 6B to the state of FIG. 6C. That is, a portion of the charge stored in the capacitor C21 of the drive circuit 12 moves to the capacitor C11 of the drive circuit 11, and a state where the capacitors C11 and C21 are schematically equally charged is exhibited. At time T2 to T3, by the operation of resetting the transformer T1 in the trigger signal generation circuit 40, the voltage level of the trigger signal TR1 becomes almost 0 (negative near 0) as shown in FIG. 7D. Accordingly, the NMOS transistor Q12 and the transistor Q14 become the OFF state.

When the capacitor C11 is charged, the transistor Q13 is turned on by the base current flowing in the resistor R11 and, at the same time, the gate is charged and the NMOS transistor Q11 is turned on through a current route of drain of transistor Q13 (node 120)→source (node 114)→gate of NMOS transistor Q11. Further, the gate of the NMOS transistor M1 is charged through the diode D15 and (the drain to source of) NMOS transistor Q11 by the charge voltage of the capacitor C11. Namely, even during the commutation period where there is no input voltage Vs of the transformer Tm, the NMOS transistor M1 turns on. On the other hand, even in the drive circuit 12, the NMOS transistor M2 turns on by the same operation as that of the drive circuit 11 by the charge voltage of the capacitor C21. Accordingly, in the switching power supply device 1 according to the present embodiment, in the commutation period, both of the NMOS transistors M1 and M2 turn on, and the drive efficiency is high.

(iv) Time T3 to T4

In the time T3 to T4, inverse to the trigger signal TRI shown in FIG. 7D, the positive trigger signal TR2 is supplied to the drive circuit 12, therefore the same operation as the operation of the drive circuit 11 in the time T0 to T1 is carried out in the drive circuit 12. Namely, before the input voltage Vs of the transformer Tm rises, the NMOS transistor M2 is rapidly turned off. Due to this, the generation of a penetration current between the NMOS transistors M1 and M2 is prevented. In the time T3 to T4, the operation of the drive circuit 11 does not change.

(v) Time T4 to T5

When the time T4 comes, as shown in FIGS. 7B and 7E, the input voltage Vs of the transformer Tm becomes positive, and the voltage $V_{AW}$ of the auxiliary winding AW becomes positive. Due to this, the equivalent circuit of the capacitors C11 and C21 and the diodes D11 and D21 changes from the state of FIG. 6C to the state of FIG. 6A. Namely, the capacitor C11 is sufficiently charged. As shown in FIG. 7D, the voltage level of the trigger signal TR1 is very small, and both of the NMOS transistor Q12 and the transistor Q14 are in the OFF state.

Figure 8:
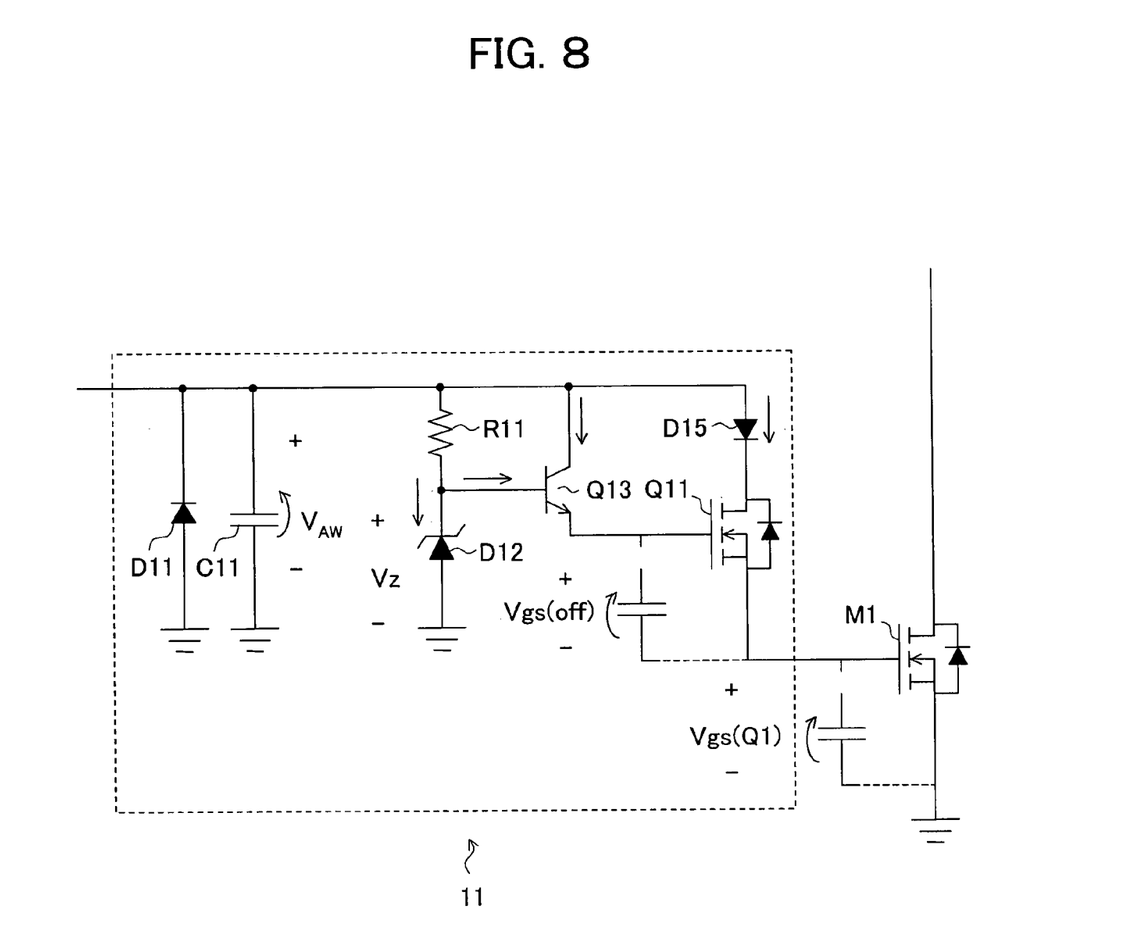

The equivalent circuit of the drive circuit 11 in this state is shown in FIG. 8. In FIG. 8, the voltage $V_{AW}$ of the auxiliary winding AW becomes the charge voltage of the capacitor C11 as it is. The NMOS transistor Q12 and the transistor Q14 in the OFF state are not described. In FIG. 8, the charge voltage $V_{AW}$ of the capacitor C11 functions as the drive power source. Due to the base current generated in the transistor Q13 via the resistor R11, the transistor Q13 is turned on and further the gate capacitor of the NMOS transistor Q11 is charged. The capacity of the gate capacitor of the NMOS transistor Q11 is sufficiently small in comparison with the NMOS transistor M1, therefore the gate-source voltage Vgs of the NMOS transistor Q11 quickly rises. Namely, when it exceeds the operation threshold voltage $V_{gs}$ (off) of the NMOS transistor Q11, the NMOS transistor Q11 quickly turns on, and the voltage $V_{AW}$ of the auxiliary winding AW or the capacitor C11 charges the gate of the NMOS transistor M1 through the diode D15 and the NMOS transistor Q11. Note that, in the present operation, the drive power source is configured by only the winding and the capacitor, therefore the output impedance is low, and the gate charging speed of the NMOS transistor M1 is fast.

Further, as explained before, the gate voltage of the NMOS transistor M1 is clamped to a voltage in accordance with the breakdown voltage of the Zener diode ($V_Z$), $V_F$ of the transistor Q13 (between base and emitter), and the operation threshold voltage $V_{gs}$(off) of the NMOS transistor Q11 (see Equation (1) explained before) and becomes a value not depending upon input voltage fluctuation of the switching power supply device 1.

Note that, in the time T4 to T5, in the drive circuit 12, the same operation as that of the drive circuit 11 in the time T1 to T2 is exhibited. Namely, the NMOS transistor M2 is in the OFF state.

(vi) Time T5 to T6

When the time T5 comes, both the input voltage Vs of the transformer Tm and voltage $V_{AW}$ of the auxiliary winding AW become 0. At this time, by a reverse flow prevention function of the diode D15, the gate charge of the NMOS transistor M1 is not discharged, so it is maintained at the clamp voltage level as is as shown in FIG. 7G. In the time T5 to T6, both of the NMOS transistors M1 and M2 have become the commutation state.

Above, the operation of the drive circuit 11 was explained above with reference to the timing charts of FIGS. 7A to 7G. As apparent in the timing charts of FIGS. 7A to 7G, in the drive portion 10 according to the embodiment, in the time T2 to T6, as shown in FIG. 7G, the NMOS transistor M1 always maintains the ON state. Namely, in both of the cases where the NMOS transistor M1 is commuted and rectified, the NMOS transistor M1 maintains the ON state, therefore there is almost no current flowing through the parasitic diode of the NMOS transistor M1 in the forward direction. Accordingly, the commutation loss is very small.

According to the synchronized rectification circuit of the present embodiment, in the commutation period, charges large enough to turn on the NMOS transistors M1 and M2 are stored in the capacitors C11 and C21. Accordingly, the rectifier constituted by the NMOS transistor M1 (or M2) turns on in all commutation periods in 1 cycle, therefore the current flowing through the parasitic diode of the FET in the forward direction becomes almost zero, and a high efficiency is obtained.

According to the synchronized rectification circuit according to the present embodiment, the trigger signal is fetched with an advance time Δt from the timing when the drain voltage of the rectifier constituted by the NMOS transistor M1 (or M2) rises. Due to this, the NMOS transistor M1 (or M2) is forcibly turned off in advance. Accordingly, no penetration current which may be generated between rectifiers is generated, and the rectifier can be turned on and off by zero voltage switching (ZVS). Namely, the loss due to the switching of the rectifier can be made very small.

According to the synchronized rectification circuit according to the present embodiment, when the NMOS transistor M1 (or M2) is ON at the time of commutation, the operation voltage thereof is clamped by the Zener diode D12 or the like (or D22 or the like), therefore the influence by the input fluctuation of the switching power source can be reduced. Accordingly, it is possible to cope with a wide range of input voltages. Further, by the clamp voltage generated by this Zener diode D12 or the like, the efficiency at the time of the commutation is greatly improved. This point will be explained with reference to FIG. 9.

Figure 9:
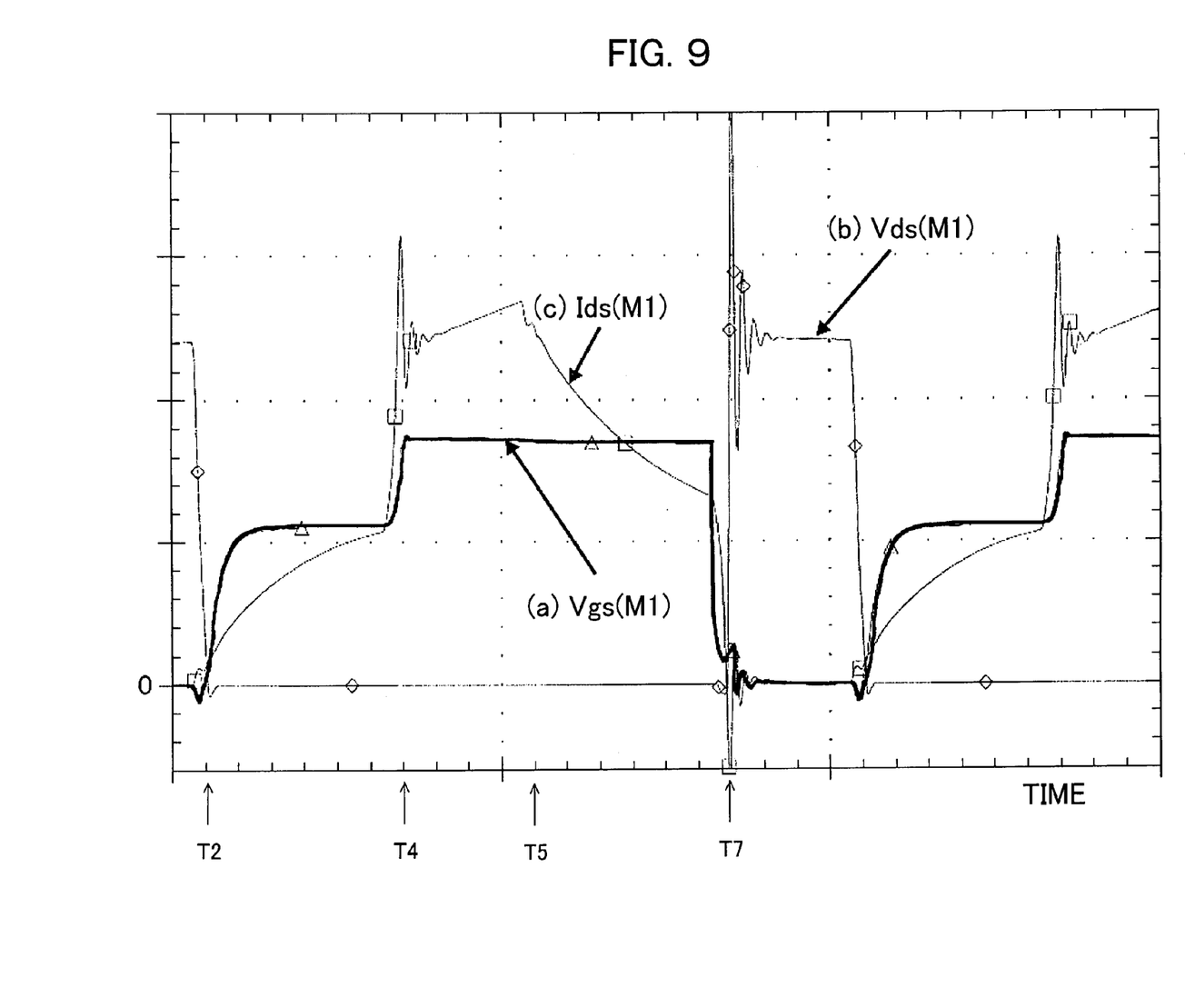
FIG. 9 is a timing chart showing the operation of the drive circuit according to an embodiment of the present invention.

FIG. 9 is a timing chart of voltages of the NMOS transistor M1 in the synchronized rectification circuit according to the embodiment, in which (a) shows a waveform of the gate-source voltage $V_{gs}$, (b) shows a waveform of the drain-source voltage $V_{ds}$, and (c) shows a waveform of the drain current $I_{ds}$. Further, times T2, T4, T5, and T7 plotted along the abscissa correspond to times along the abscissas of FIGS. 7A to 7G.

In the timing chart of FIG. 9, the time T2 to T4 and the time T5 to T7 are commutation periods where there is no input to the transformer Tm (Vs=0) (see FIG. 7). The NMOS transistor M1 begins to turn on from the time T2, but as shown in (c), the drain current $I_{ds}$ slowly increases due to the inductance component of the transformer Tm. In the time T2 to T4, the gate-source voltage $V_{gs}$ becomes lower than the peak and the ON resistance is higher, but the drain current $I_{ds}$ is at the lower level, therefore there is no problem in efficiency.

On the other hand, in the time T5 to T7, the energy stored in the inductance component of the transformer Tm in the time T3 to T5 is released, but as shown in (c), in actuality, the energy cannot be abruptly released, therefore, in the time T5 to T7, a drain current $I_{ds}$ of a magnitude near the peak current remains. In this time T5 to T7, in the drive circuit 11, the gate voltage of the NMOS transistor M1 is clamped by the Zener diode D12, therefore, as shown in (a), in comparison with the time T4 to T5, the gate voltage $V_{gs}$ does not change. Namely, the high gate voltage $V_{gs}$ is maintained, therefore, the ON resistance of the NMOS transistor M1 is very low, and the efficiency can be raised irrespective of the actually remaining large current.

Figure 10:
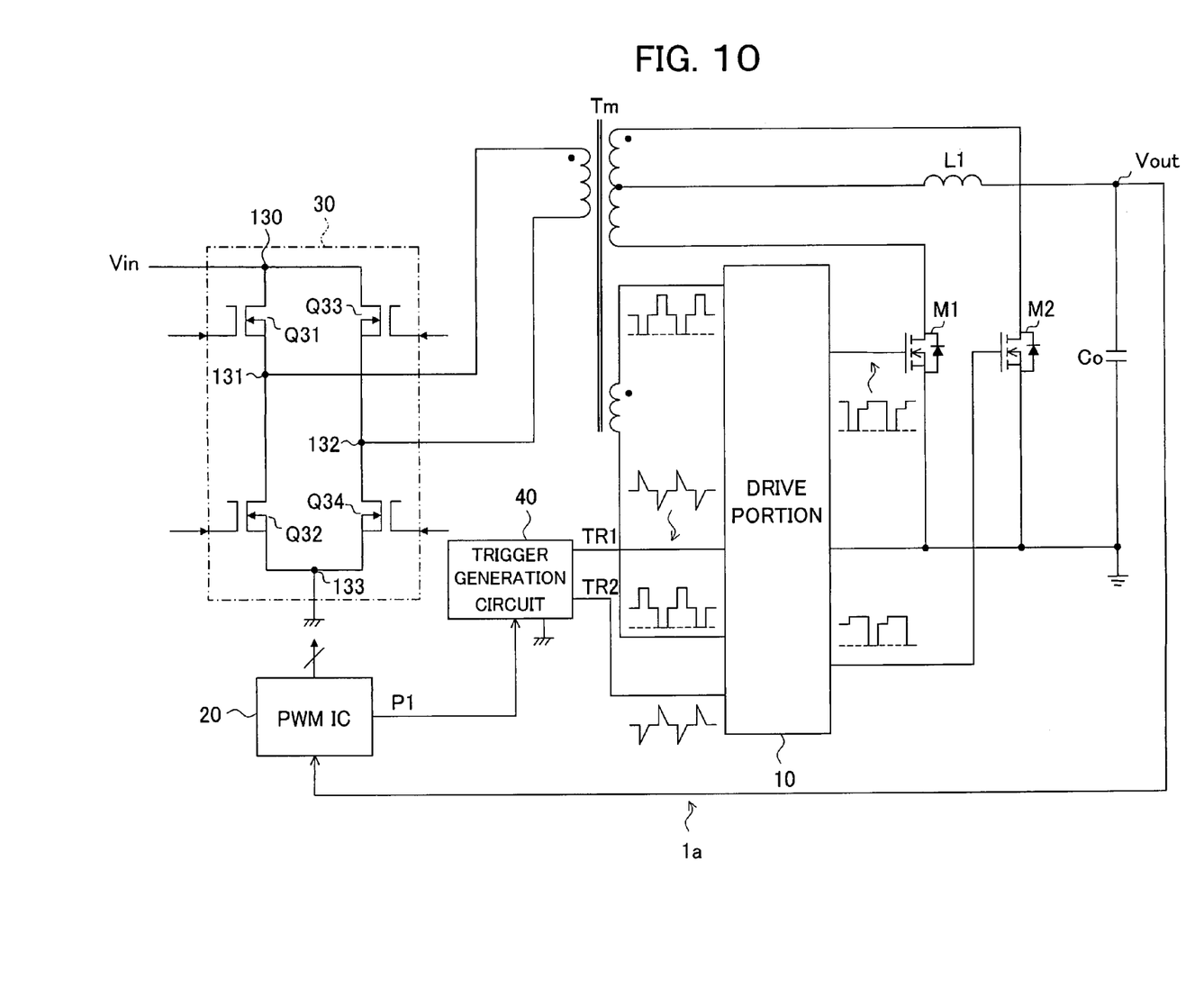
FIG. 10 is a block diagram showing another configuration of a switching power supply device according to an embodiment of the present invention.

Note that the present invention is not limited to the embodiment explained above. A person skilled in the art can make a variety of modifications within a range not out of the gist of the present invention. For example, FIG. 10 is a block diagram showing another configuration of the switching power supply device according to the embodiment. In a switching power supply device 1a shown in FIG. 10, the secondary side of the transformer Tm is made a center tap type. Note that the operation in this case is similar to that of the switching power supply device 1 explained above.

Further, the switching power supply device 1 according to the above embodiment is characterized by the driving method of the rectification use switching element. A person skilled in the art can apply a various of known art for the other technical means, for example, the method of generation of a voltage pattern applied to the transformer Tm and a method of extraction of the DC voltage rectified by the rectification use switching element. The present invention can be applied to synchronized rectification circuits in various types of switching power supply devices such as the forward type, flyback type, and half bridge type.

Note that the correspondence between the above embodiment and the claims of the present invention will be described below. The transformer Tm corresponds to the "transformer" of the claims of the present invention. The NMOS transistors M1 and M2 correspond to the "first and second switch elements" of the claims of the present invention. The trigger signals TR1 and TR2 correspond to the "first and second trigger signals" of the claims of the present invention. The PWM control circuit 20 corresponds to the "control circuit" of the claims of the present invention. The transistors Q11, Q12, Q21, Q22, Q14, and Q24 correspond to the "first, second, third, fourth, fifth, and sixth transistors" of the claims of the present invention. Here, the transistors Q11, Q12 and Q14 are included in "first driving means" of the claims in the present invention. Further, the transistors Q21, Q22 and Q24 are included in "second driving means" of the claims in the present invention. The capacitors C11 and C21 correspond to the "first and second voltage holding means" or the "first and second capacitors" of the claims of the present invention. The diodes D11 and D21 correspond to the "first and second (discharging) diodes" of the claims of the present invention.

The transformer Tm and the auxiliary winding AW correspond to the "inputting means" of the claims of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A synchronized rectification circuit comprising:
an inputting means for inputting an AC voltage that becomes a negative polarity voltage in a first period, becomes a positive polarity voltage in a third period, and becomes an intermediate voltage between said negative voltage and said positive voltage in second and forth periods;
a rectification means including a first switch element and a second switch element and for inputting said AC voltage from said inputting means;
a first voltage holding means for holding a voltage in response to shift an input voltage of the rectification means to said positive polarity voltage and releasing the held voltage in response to input said negative voltage;
a second voltage holding means connected with said first voltage holding means capable to equalize held voltages in response to sift said input voltage to said intermediate voltage, for holding a voltage in response to shift said input voltage to said negative polarity voltage and releasing the held voltage in response to input said positive voltage;
a first driving means for turning on said first switch element according to said held voltage of said first voltage holding means changed in response to shift said input voltage to said intermediate voltage from said negative polarity voltage and turning off said first switch element earlier than a time where said input voltage shifts to said negative polarity voltage from said intermediate voltage; and
a second driving means for turning on said second switch element according to said held voltage of said second voltage holding means changed in response to shift said input voltage to said intermediate voltage from said positive polarity voltage and turning off said second switch element earlier than a time where said input voltage shifts to said positive polarity voltage from said intermediate voltage.

2. A synchronized rectification circuit comprising:
a transformer having a primary winding, a secondary winding and an auxiliary winding and for inputting via said primary winding an AC voltage that becomes alternately a negative polarity voltage and a positive voltage and becomes an intermediate voltage having a value between said negative voltage and said positive voltage in transition periods of voltage polarity;
a trigger voltage generation circuit for generating a first trigger voltage advanced in phase with respect to said positive polarity voltage at a time of inputting to said transformer and a second trigger voltage advanced in phase with respect to said negative polarity voltage at a time of inputting to said transformer;

a rectification means including a first switch element connected to one end of said secondary winding and a second switch element connected to the other end of said secondary winding;

first and second capacitors connected in series between one and the other ends of said auxiliary winding;

a first discharging diode connected in parallel to said first capacitor;

a second discharging diode connected in parallel to said second capacitor;

a first transistor connected between said one end of said auxiliary winding and a control node of said first switch element and for turning on said first switch element in response to input said positive polarity voltage to said transformer;

a second transistor for turning on said first switch element in response to receive said first trigger voltage;

a third transistor connected between said the other end of said auxiliary winding and a control node of said second switch element and for turning on said second switch element in response to input said negative polarity voltage to said transformer; and a forth transistor for turning on said second switch element in response to receive said second trigger voltage.

3. A synchronized rectification circuit as set forth in claim 2, further comprising a fifth transistor for turning off said first transistor at a time earlier than that said second transistor turns off said first switch element and a sixth transistor for turning off said second transistor at a time earlier than that said forth transistor turns off said second switch element.

4. A switching power supply device comprising:

a switching circuit for switching a conductive state of a DC voltage and generating a AC voltage which alternately becomes a negative polarity voltage and a positive polarity voltage and becomes an intermediate voltage having a value between said negative voltage and said positive voltage in transition periods of voltage polarity;

a transformer having a primary winding, a secondary winding and an auxiliary winding and for inputting via said primary winding said AC voltage;

a trigger voltage generation circuit for generating a first trigger voltage advanced in phase with respect to said positive polarity voltage at a time of inputting to said transformer and a second trigger voltage advanced in phase with respect to said negative polarity voltage at a time of inputting to said transformer;

a rectification circuit including a first switch element connected to one end of said secondary winding and a second switch element connected to the other end of said secondary winding;

a drive circuit for driving said first and second switch elements according to an AC voltage input via said auxiliary winding; and a control circuit for controlling a ratio of the negative polarity voltage and the positive polarity voltage in one cycle of said AC voltage to be input to said transformer in accordance with an output voltage of said rectification circuit, wherein said drive circuit has first and second capacitors connected in series between one and the other ends of said auxiliary winding, a first discharging diode connected in parallel to said first capacitor, a second discharging diode connected in parallel to said second capacitor, a first transistor connected between said one end of said auxiliary winding and a control node of said first switch element and for turning on said first switch element in response to input said positive polarity voltage to said transformer, a second transistor for turning on said first switch element in response to receive said first trigger voltage, a third transistor connected between said the other end of said auxiliary winding and a control node of said second switch element and for turning on said second switch element in response to input said negative polarity voltage to said transformer, and a forth transistor for turning on said second switch element in response to receive said second trigger voltage.

5. A switching power supply device as set forth in claim 4, wherein said driving circuit further has a fifth transistor for turning off said first transistor at a time earlier than that said second transistor turns off said first switch element and a sixth transistor for turning off said second transistor at a time earlier than that said forth transistor turns off said second switch element.

* * * * *